United States Patent [19]

Matte et al.

[11] Patent Number: 5,033,775
[45] Date of Patent: Jul. 23, 1991

[54] CONNECTING OR BRANCHING DEVICE FOR FLEXIBLE HOSES

[75] Inventors: Pierre Matte; Francois Buffey, both of Nevers, France

[73] Assignee: Caoutchouc Manufacture et Plastiques, Versailles, France

[21] Appl. No.: 353,381

[22] Filed: Apr. 3, 1989

Related U.S. Application Data

[63] Continuation of Ser. No. 28,467, Mar. 29, 1987, abandoned.

[30] Foreign Application Priority Data

Mar. 20, 1986 [FR] France .............................. 86 03972

[51] Int. Cl.⁵ ............................................. F10L 41/00
[52] U.S. Cl. .................................. 285/150; 285/156; 285/381; 285/423
[58] Field of Search ............... 285/381, 423, 156, 297, 285/294

[56] References Cited

U.S. PATENT DOCUMENTS

| 3,315,986 | 4/1967 | Quick ...................... 285/381 X |
| 3,415,287 | 12/1968 | Heslop et al. ................ 285/381 X |
| 3,458,619 | 7/1969 | Prochaska . |
| 3,567,259 | 3/1971 | Benson et al. ...................... 285/381 |
| 3,847,694 | 11/1974 | Stewing .......................... 285/381 X |
| 3,898,369 | 8/1975 | Clabburn . |
| 3,975,039 | 8/1976 | Penneck et al. ...................... 285/156 |
| 4,070,044 | 1/1978 | Carrow ............................ 285/381 X |
| 4,163,117 | 7/1979 | Campbell et al. . |
| 4,170,296 | 10/1979 | Wetmore . |
| 4,235,832 | 11/1980 | Leighton . |
| 4,236,736 | 12/1980 | Anderson ............................. 285/150 |
| 4,251,304 | 2/1981 | Campbell et al. . |
| 4,264,780 | 4/1981 | Rolland . |
| 4,287,012 | 9/1981 | Midgley et al. . |
| 4,297,155 | 10/1981 | Jervis . |
| 4,386,984 | 6/1983 | Jervis . |
| 4,497,926 | 2/1985 | Toy . |
| 4,514,244 | 4/1985 | Shaefer et al. .................. 285/156 X |
| 4,586,971 | 5/1986 | Wallace Jr. . |
| 4,589,939 | 5/1986 | Mohebban et al. . |
| 4,596,732 | 6/1986 | Diaz . |
| 4,641,860 | 2/1987 | McMickle et al. ............. 285/150 X |
| 4,648,628 | 3/1987 | Meadows et al. .............. 285/156 X |
| 4,650,220 | 3/1987 | Grabowski ..................... 285/156 X |
| 4,656,070 | 4/1987 | Nyberg et al. . |
| 4,676,532 | 6/1987 | Gronau et al. ....................... 285/156 |
| 4,718,700 | 1/1988 | Horch et al. ........................ 285/156 |

FOREIGN PATENT DOCUMENTS

| 88571 | 9/1983 | European Pat. Off. . |
| 0110102 | 6/1984 | European Pat. Off. . |
| 3430053 | 1/1986 | Fed. Rep. of Germany ...... 285/156 |
| 1488316 | 6/1967 | France . |
| 2506892 | 12/1982 | France . |
| 2562886 | 10/1985 | France . |
| 51-135960 | 11/1976 | Japan . |
| 2138527 | 10/1984 | United Kingdom ................ 285/156 |
| 2182110 | 5/1987 | United Kingdom . |

Primary Examiner—Dave W. Arola
Assistant Examiner—Carol I. Bordas
Attorney, Agent, or Firm—Antonelli, Terry, Stout & Kraus

[57] ABSTRACT

A process of manufacture for and the article which comprises a connecting and/or branching of flexible hoses is characterized in that an outer covering element (6) provides a compressive action of the walls of the ends of the flexible hoses (5) onto a rigid inner pipe (1). The outer covering element (6), may comprise a polymer of which the contraction during cooling of the polymer is at least equal to 1% of its original diameter. The invention is adapted for use in fluid circuits between different parts or engine units in a vehicle.

19 Claims, 4 Drawing Sheets

CONNECTING OR BRANCHING DEVICE FOR FLEXIBLE HOSES

This application is a continuation of application Ser. No. 07/028,467, filed Mar. 20, 1987, now abandoned.

BACKGROUND OF THE INVENTION

1. Scope of the Invention

The invention pertains to any arrangement of fluid circuits which includes flexible hoses that require connections, branch-hoses or bleeding devices and, especially, to thermal exchange circuits mounted on automobile or road vehicles.

Said fluid circuits are designed for linking different parts—or engine units in the case of vehicles—and they must display, simultaneously, longevity features,—in spite of the hostile environment resulting from temperature, pressure, the presence of greases or oil-chemical resistance to conveyed fluids and airtightness.

The linking of different engine parts or units implies that the flexible hoses include a number of connections, most often on rigid nozzles, usually metallic, as well as branch-hoses of which the diameters can be equal to that of the main hose or different therefrom.

Whereas the flexible hoses display a high degree of reliability because of the character of the constituent elastomer material(s) which include(s) usually reinforcement elements, continuous or discontinuous, comprised of textile or metallic substances, the connecting zones with parts or units and those for connecting the branch-hoses or bleeding devices on the main hosing represent weak points where leaks can occur or even disconnections triggered by tear-off under the effect of pressure and temperature or simply because of the creep of elastomer-based compounds under these hostile circumstances.

2. Description of the prior art

In order to alleviate these risks, various solutions have been offered. Some, which are purely mechanical, like those described in patents EP 88 571 or DE 3 430 053, pertain to inserting inside the flexible hose a rigid pipe, which is usually metallic, fixed with any means and having an enlarged end.

Other solutions attempt to prevent the risks of probable leaks or disconnection with a rubber- or synthetic resin-based duplicate moulding, as suggested in patents FR 2 506 892, FR 2 562 886 or EP 0 110 102.

The current solutions display many inconveniences:

they weaken the intrinsic resistance of the main flexible hose, by requiring the boring of the wall that reduces the section of materials which will be subjected to mechanical stress or destroys, locally, the reinforcement of said wall; furthermore, this boring induces, along the crests of the bored hole thus performed, incipient tearing in a zone that, during operation, will be highly stressed;

their manufacturing is difficult because they require the introduction, inside the main flexible hose, either of metallic anchoring parts in the case of mechanical solutions, or, for the duplicate moulding solutions, inner cores inside the branching zone, in order to ensure vital counterpressure during the duplicate moulding operation, followed by their extraction once the operation is over. In order to facilitate those manipulations, the inner cores are often coated with a lubricating, antiadhesive agent from rubber, that can contaminate the duplicate moulding zone and thus hamper the quality of the intimate linking that is necessary between the duplicate moulding and the outer surface of the flexible hose. Moreover, the inner core introduction and extraction operations might trigger, on the inner side of the main and secondary flexible hose, wounds which, although superficial, produce incipient constraints that accelerate the decay of said hoses;

their manufacture is costly, in terms or laying the metallic inserts inside the flexible hose in the case of mechanical solutions, and of requiring two successive operations,—injecting the duplicate moulding material onto the flexible hose then vulcanizing under pressure, inside the mould which lasts for several minutes and subsequently mobilizes implements, in the second category of solutions;

they prohibit the laying of branch-hoses of the same diameter as that of the main flexible hose, because of the size required for passage of the metallic insert or of the inner core; they also prohibit, for reasons of difficult access, the laying of branch-hoses inside zones far away from the end of the main flexible hose;

in the case of duplicate moulding, they shorten the life span of the main hose by requiring additional thermal treatment of the branching zone which leads to overvulcanizing the rubber-based mixture, therefore to a weakening of mechanical features and to a less resistance to ageing, in the considered zones.

finally, they require a state of perfect cleanliness in the areas to be assembled and they therefore require the use of solvents for reviving them, which is noxious to health at the work station and produces risks of fire or explosion in the shop.

Analysis of the prior art obviously indicates that a device which enables connections, branching of hoses or bleed to be made on a flexible hose, which displays the necessary reliability features while being economical from the manufacturing standpoint, is not known.

Moreover, we must note that the evolution of industrial technology—that of automobiles, especially—increases substantially the operating constraints, more specifically, in the areas of temperature and pressure.

SUMMARY OF THE INVENTION

Therefore the purpose of the invention is to provide by using less costly and safer manufacturing means a novel device to connect a flexible hose either to a rigid fitting or to one (or more) branch hoses, or a bleeding system, that offers guaranteed reliability and longevity under mechanical stress, the aggressiveness of conveyed fluids and the effect of the hostile environment, while avoiding any risk of leaks or disconnection.

The invention pertains to both the process of manufacture and the connecting device obtained by said process.

With respect to the process of manufacture, the invention is characterized by the achieving of a hooping effect with a compressive action on the ends of the flexible hose walls, in the connection area, onto a rigid inner pipe, either straight or T-, Y- or cross-shaped, by an outer enveloping element, said compressive action being obtained by thermal treatment, under pressure, of a polymer material undergoing contraction during cooling which is equal at least to 1% of its initial diameter.

In order to simplify the description of the invention, said polymer material shall be referred to hereafter as a shrinkable or retractable polymer.

The process of manufacture of the connecting device includes basically the following steps:

The flexible hoses to be connected are mounted on the ends of an inner pipe which displays an appropriate form, The ends of the flexible hoses thus mounted are positioned inside a mould, at an ambient temperature, that we close, then the retractable polymer is injected inside the mould, with a machine frequently used in the polymer transformation industry that operates under high temperature and under high pressure, when it penetrates inside the mould, the retractable polymer takes the form of the mould print, when it cools, the diameter of the moulding thus obtained reduces, as a result of the thermal properties of the retractable polymer, and thus compresses the walls of the ends of the flexible hoses onto the rigid inner pipe.

The last three phases of the operation last about 20 to 60 seconds. In a specific example, the unit is comprised of flexible hoses and after the connecting device is withdrawn from the mould, the contraction effect slowly continues as the temperature drops and finally becomes stable after 24 hours, more or less.

With respect to the product thus manufactured, the invention is characterized by the fact that said device is comprised of an inner rigid pipe, resisting pressure and temperature brought into play during the process and of an outer covering element made of a retractable polymer substance which provides the compression of the wall of the flexible hoses onto said inner pipe.

BRIEF DESCRIPTION OF THE DRAWINGS

The characteristics and various embodiments of the invention will be better understood after reading the description which follows the drawings, wherein.

DESCRIPTION OF PREFERENTIAL EXECUTIONS

Figure 1:
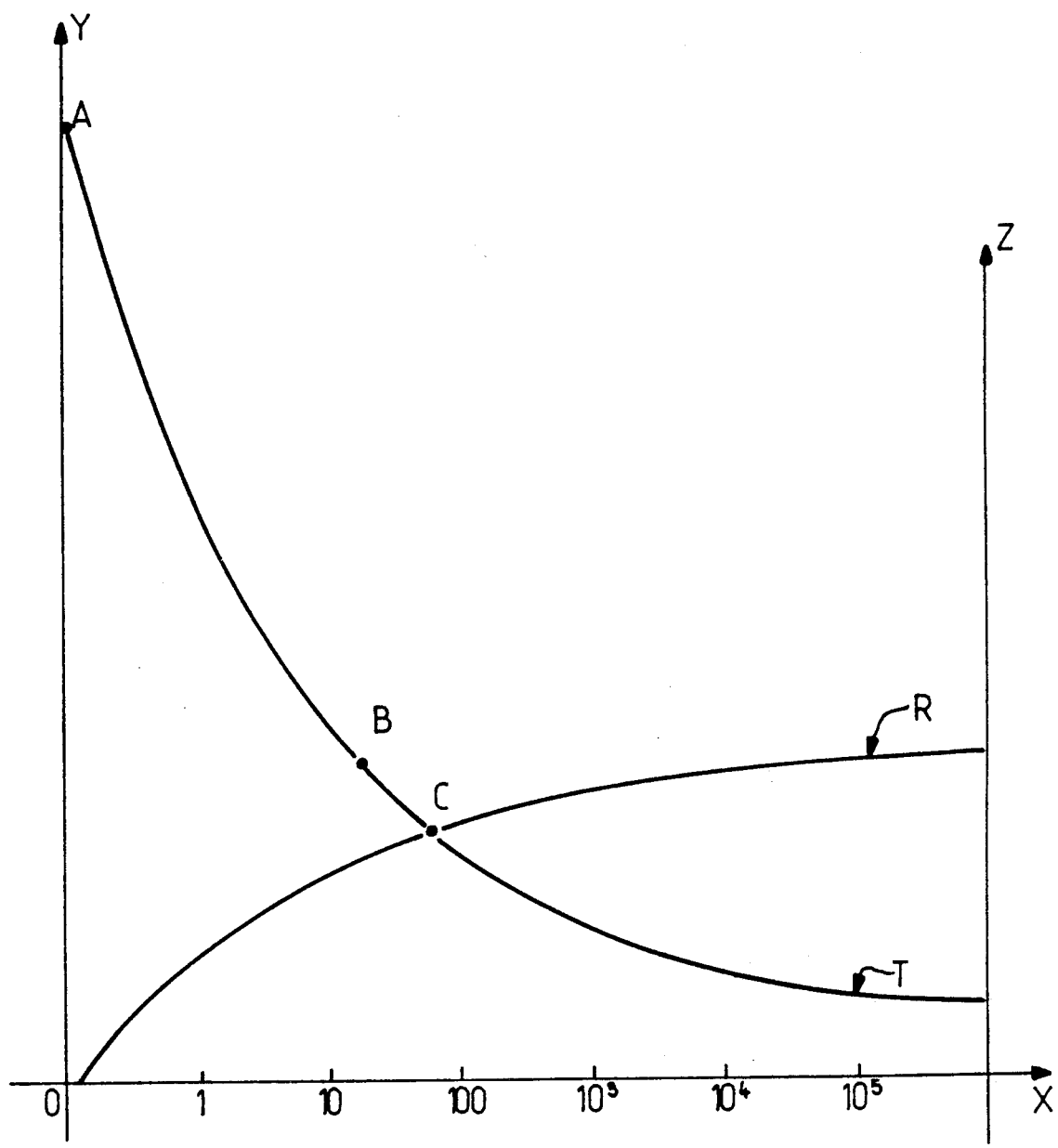
FIG. 1 schematizes, on a graph, the evolution in temperature and in contraction of the retractable polymer.

In FIG. 1, the purpose of which is to disclose the process of manufacture, the abscissa OX represents time, in seconds, on a logarithmic scale, the ordinate OY represents the temperature of the material and the axis OZ represents the relative contraction of the material.

Therefore, the curve T indicates variations in the temperature of the retractable polymer according to time.

As a non restricting example, the application of the process will be described for injecting a technical polyamide, a non-rubber based thermoplastic material that is dimensionally stable, and therefore non-elastic, at room temperature, which makes it possible to give a few orders of magnitude, but it is obvious for one skilled in the art of polymer processing that other materials which display a cooling retraction capacity greater than 1% of its original diameter and are non-elastic may be used.

In the case of technical polyamide, the temperature is 270° C. at point A, when the injection takes place, but, as the molten polymer penetrates inside the cold mould, the temperature of the material rapidly drops to about 120° C. at point B, or about 30 seconds later, and to about 100 C. at point C, 45 to 60 seconds after the beginning of the injection.

At the same time, as shown by like the curve R, the contraction of the retractable polymer that is solidifying goes from 0 to 1 or 2 % of its original diameter between point O and point C where said curve R tends towards a horizontal asymptote, the evolution between the value C and the stabilized contraction being very slight after 24 hours.

With respect to the simplicity and economy of the process, the length of the operation between the closing of the mould—containing the ends of the flexible hoses with the connecting device—and the withdrawal of the unit from the mould is less than 1 minute. This length of time will be compared advantageously to the rubber duplicate moulding process, in which the length of injection and vulcanizing operations is 3 to 6 minutes.

The energy savings and the reduction in the tying-up of equipment is substantial.

Moreover, the operations of boring the main flexible hose, for introducing and extracting primary inner cores (inside the main flexible hose) and the secondary one (inside the connected element) are eliminated as well as the cleaning and reviving operations with solvents.

FIG. 2 represents, as non restricting examples, several embodiments of the inner pipe (1) which can be comprised of any rigid material—metallic, composite or plastic—that is able to support, without distortion, pressure and temperature brought to play during the process.

Figure 2A:
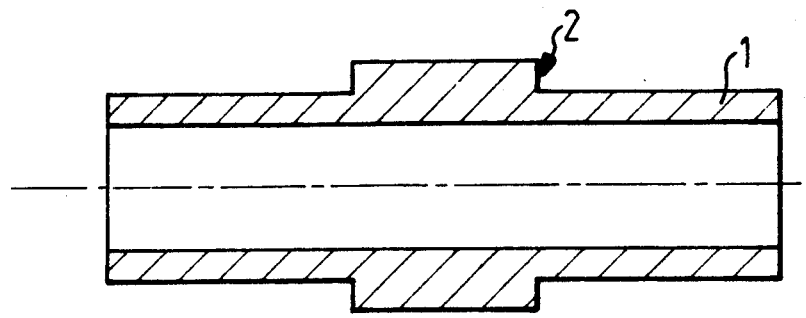
FIG. 2 illustrates various embodiments of the inner pipe of the connecting device.

FIG. 2a depicts a straight, inner pipe (1), for in-line connection of two flexible hoses (here with the same diameters), comprised of rubber-based compounds with identical or different formulations. Said inner pipe (1) includes a flange (2) against which abut for the ends of the flexible hoses which will be mounted there, making it thus possible to ensure that they are properly fitted along the desired length.

Figure 2B:
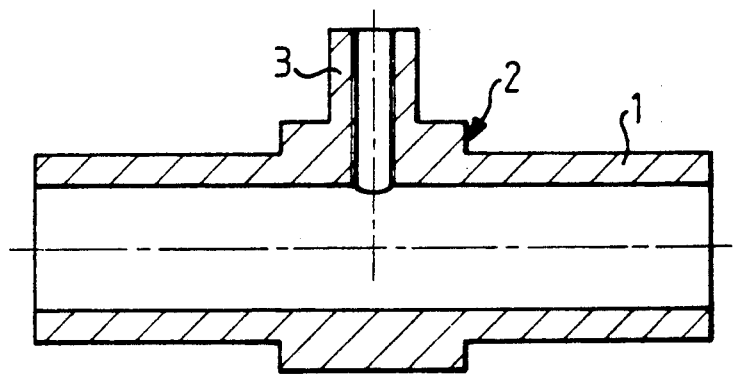

FIG. 2b depicts a straight, inner pipe (1), which includes a bleeding device (3) that makes possible in line connection of two flexible hoses (here with the same diameters) made of rubber-based compounds with identical or different formulations. Said straight, inner pipe (1), with a bleeding device (3) is equipped, in its central section with a flange (2) against which abut the ends of the flexible hoses of the same kind as that in FIG. 2a.

Figure 2C:
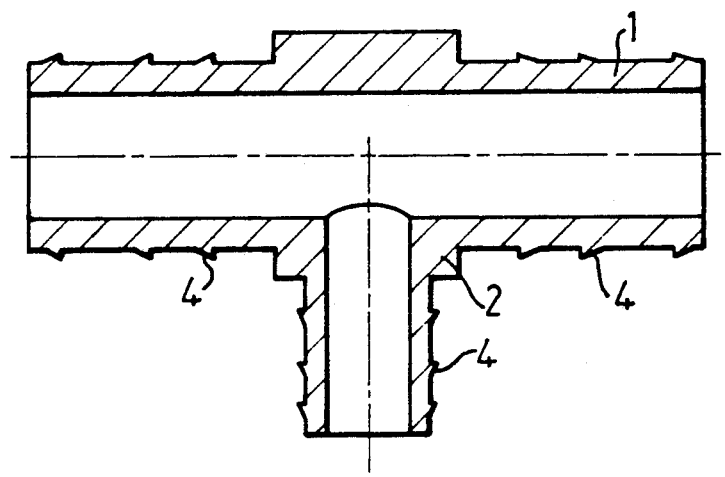

FIG. 2c depicts the embodiment of a simple branch-hose which utilizes a T-shaped pipe (1), allowing the connection of a flexible hose (here it has a diameter which is smaller than that of the main hose) to a main hose. Said T-shaped, inner pipe (1), is equipped with circumferential ribs (4) which favor mechanical adhesion of the main hoses or of the branch-hose of said inner pipe (1). The number, shape, depth and arrangement of said ribs (4) are obviously adaptable depending on the rubber-based compounds, whether reinforced or not, that make up the connected flexible hoses, in order to provide optimum mechanical bonding.

The rigid inner pipes (1) can take on more complex shapes (not depicted)—such as a Y in order to achieve a simple branch that is not perpendicular to the main flexible hose or an X to execute multiple branches—and they can be optionally equipped with ribs (4) and with the flange (2).

In order to improve the reliability of the connection, it is possible to use an adhesive bond between the inner pipe (1) and the ends of the main hose or branch-hoses that are mounted there.

FIG. 3 illustrates different applications of the connecting device which is the object of the invention.

Figure 3A:
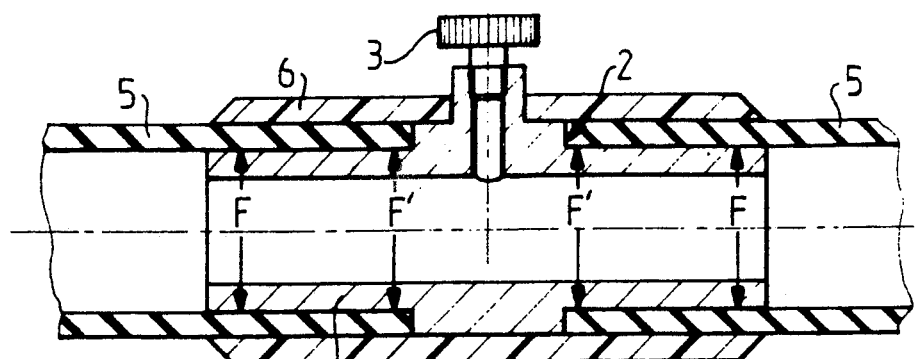
FIG. 3 illustrates different applications of the connecting device.

FIG. 3a depicts the illustration for a simple bleeding device. The flexible hoses (here of the same diameter) (5) ar mounted abutting the flange (2) of the straight pipe (1) which includes the bleeding device (3).

After the injection process of the previously described retractable polymer which will constitute the outer covering element (6), the contraction of said retractable polymer provides compression of the wall of the flexible hoses (5) in the zones FF' between the rigid inner pipe (1) and the outer covering element (6).

Figure 3B:
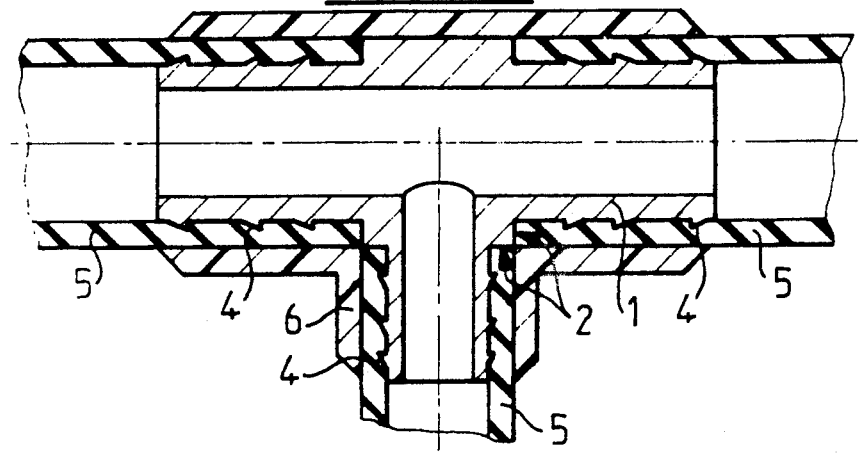

FIG. 3b depicts the application of the connecting device for the embodiments of a simple branch-hose. The main and branch-hoses (5) are mounted on the corresponding branches of the rigid inner pipe (1), T-shaped, abutting the flanges.

Then, the outer covering element (6) is moulded under the previously described circumstances in order to compress the walls of the ends of the flexible hoses (5) onto the rigid inner pipe (1). In the illustrated embodiments, said T-shaped, inner pipe (1), includes ribs (4) which increase the mechanical bond with the ends of the flexible main and branch-hose flexible ducts (5).

Figure 3C:
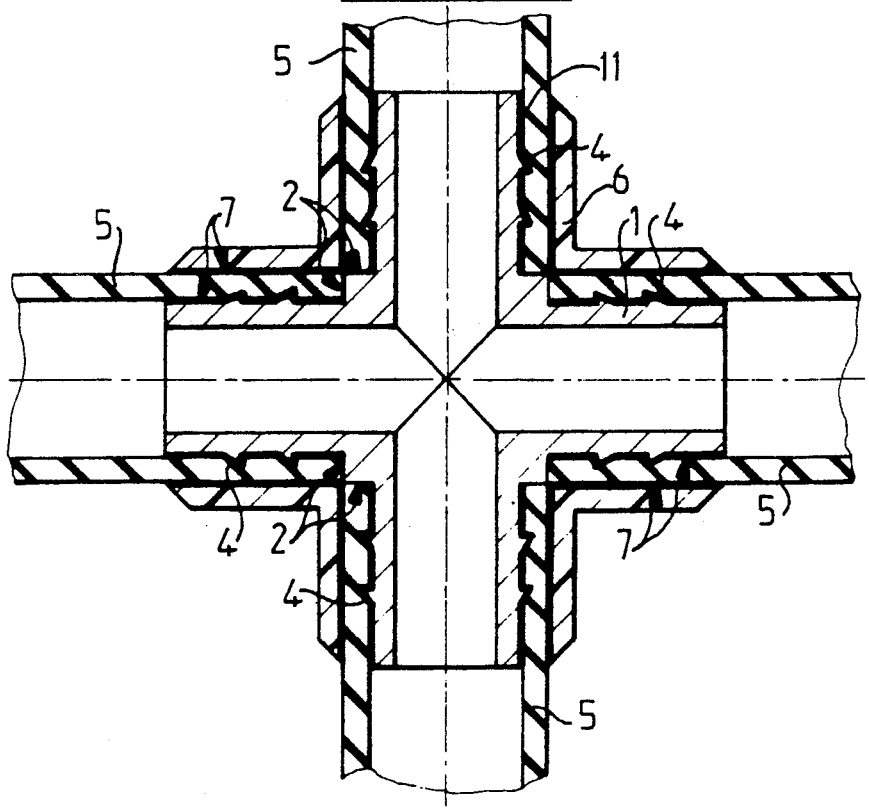

FIG. 3c depicts the application of the connecting device to a multiple branch-hose. The ends of the main and branch-hose flexible ducts (5) are mounted abutting flanges (2) of the various branches of the rigid inner pipe (1), in the shape of an X, which includes ribs (4) for mechanical bonding. As in the previous views, the outer covering element (6) compresses the walls of the ends of the flexible hoses (5) onto the rigid inner pipe (1).

In the illustrated embodiment an adhesive composition (7) is added between the rigid inner pipe (1), at of an X shape, and the inner liner at the ends of the flexible hoses (5), as well as an adhesive composition (7) between the outer covering element (6) and the outer cover of the ends of the flexible hoses (5), said adhesive can be identical in composition or different, according to the nature of the rubber-based compounds that make up the flexible hoses.

Figure 3D:
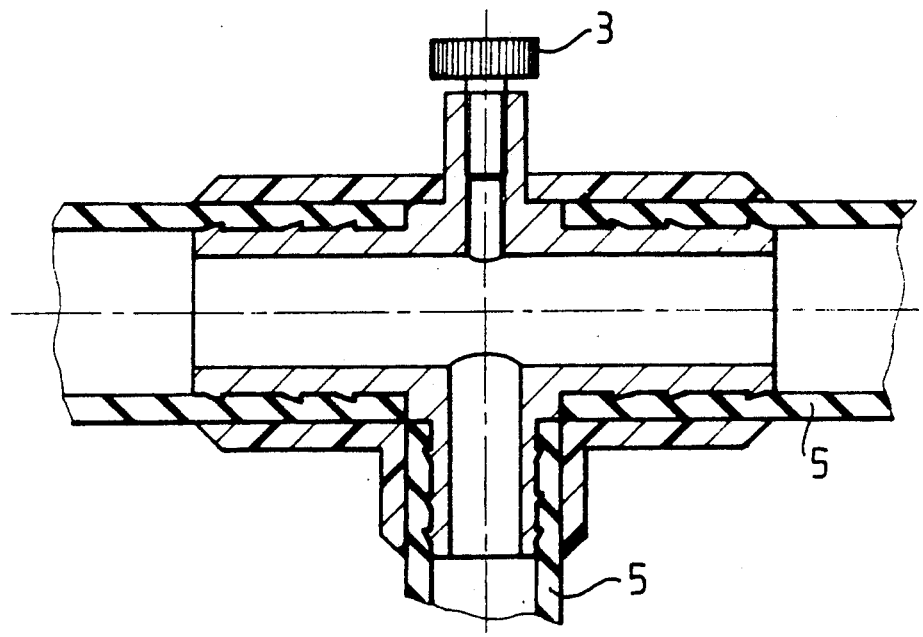

FIG. 3d illustrates in a similar way the application of the connecting device to the fitting in the same zone, of a branch-hose and of a bleeding device (3).

Figure 3E:
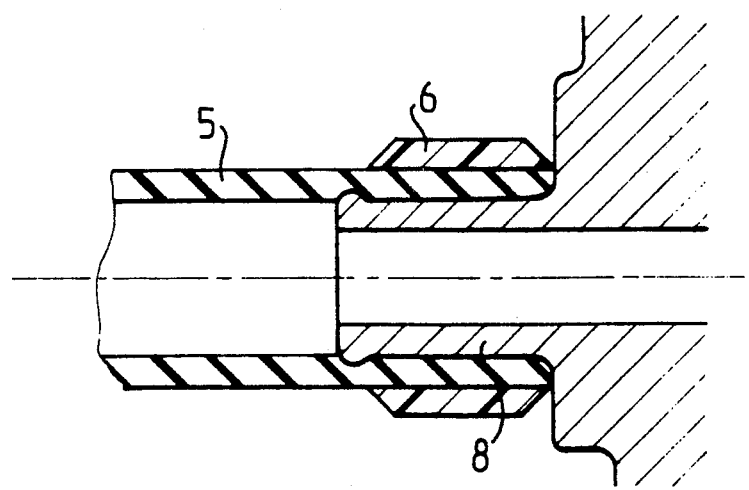

FIG. 3e depicts a connecting device of a flexible connection (5) onto the endpiece (8), which is usually metallic, of a part of equipment or an engine unit, said endpiece (8) must be obviously removable in order to be inserted inside the mould with the end of the flexible hose (5), because it acts as the inner pipe.

It is obvious, to one skilled in the art, that the previously described different embodiments such as the presence of ribs (4), of the flange (2), the use of an adhesive composition (7) between the inner liner at the ends of the flexible hoses (5) and the inner pipe (1) and/or between the cover of the ends of said flexible hoses (5) and the outer covering element (6) can be used isolatedly or in combination on the various types of simple or multiple connections and branchings.

BENEFITS OF THE INVENTION

To summarize, the process for connecting and/or branching for flexible hoses, the subject of the invention, displays the following benefits:

it does not affect the intrinsic resistance of the main flexible hose, since boring is not required, it is easy to execute and it does not require any special equipment since it uses conventional processing machinery of the polymer industry, it saves time, energy and implement immobilization, since its duration is very short in relation to that of rubber duplicate moulding, because of the compressive action, it absorbs manufacturing tolerances of the flexible hoses proper, since a difference in wall thickness can be compensated for by the injection of the corresponding volume of retractable polymer, it ensures safety for personnel and at the work station, by avoiding the handling of dangerous solvents, finally, it reduces substantially the need and number of inspections required on the flexible branching hoses, thus contributing a time and personnel savings. Indeed, in order to achieve compressive action of the wall of flexible hoses, it is necessary for the filling of the mould to take place without a lack of material. This quality aspect of filling can be verified with a simple visual control, inadequate filling can translate irreversibly into surface and form defects. This reduction of control costs becomes important when we realize that, for vehicle fluid hoses, for instance, the specifications require tests of several thousand cycles with and without pressure on the flexible branch-hoses.

With respect to the branching and/or connecting device, it offers the following benefits:

it enables branch-hoses or bleeding systems to be fitted in areas even if the latter are far away from the end of the flexible hose, it enables the branching of branch-hoses even if the diameters are equal to those of the main flexible hoses, it enables the placing of the bleeding system right in the branch area, it offers the possibility of connecting flexible, main or branch-hose, hoses made of different rubber compounds to resist different types of aggressive environments such as heat and oil or greases, for instance. It is obvious to one skilled in the art of rubber compounding that a technico-economic maximum cannot be attained with the use of a single compound which has to meet, in neighboring zones, thermal, dynamic and chemical requirements. But the polymer compounder also knows that all the materials are not compatible among themselves and that sometimes it is impossible to ensure a reliable adhesive bond between two compounds. The polymer material does not chemically bond or unite with the outer surface of an underlying branch hose. Therefore, the use of the connecting device which is the subject of the invention provides a solution to this problem, it acts as a multiple clamping unit of the walls of the flexible hoses onto a rigid pipe, without the possibility of slippage and therefore it promotes secure branchings on the machines or the engine units, it provides, as a result of the quality of the material and of the finish of the surface an aesthetic quality not provided by the strengthening element which was more or less efficient in previous devices, and finally, and very importantly, it displays a degree of reliability that has not been previously attained, even without adhesive composition between the flexible hoses and, on the one hand, the inner pipe and/or the outer covering element, on the other. Indeed, tests have demonstrated that a tear force of more than 80 daN was needed, at an ambient temperature, in order to separate an unbonded hose with a diameter of 22 millimeters, from the connecting device.

Other embodiments of the invention will become apparent from the foregoing examples and all equivalents which fall within the scope of the appended claims are intended to be covered thereby. Various modifications to the previously described process and to the device as well as their illustrated applications provided as non restricting examples, without exceeding the framework of the invention.

We claim:

1. A connecting and/or branching device for use in a fluid system which comprises:
   a rigid inner pipe;
   at least one flexible hose having a wall with inner and outer surfaces, and an end portion of the inner surface extending over an outer surface of said rigid inner pipe; and
   an outer covering means that has an internal diameter which surrounds the end portion of said at least one flexible hose, said outer covering means being made of a non-elastic polymer which is injection moulded about said end portion and contracts during cooling in place on the hose outer surface following thermal heating to higher than ambient temperature when formed on said flexible hose, the contraction being at least equal to 1% of the covering means internal diameter to provide a compressive action on a hose end of said at least one flexible hose that is fitted onto the rigid inner pipe, said compressive action being achieved between the outer covering means and the rigid inner pipe to provide a mechanical bonding between the at least one flexible hose and the rigid inner pipe.

2. A connecting and/or branching device according to claim 1, characterized in that the rigid inner pipe is equipped with ribs designed to increase the compressive action of the walls of the end of said at least one flexible hose with a hooping effect.

3. A connecting and/or branching device according to claim 2, characterized in that said at least one flexible hose has an inner lining, and the resistance to separation of the wall of the end of each flexible hose from the rigid inner pipe and the covering means is reinforced with the use of an adhesive composition positioned between the inner lining of the end of the flexible hose and an outer surface of said inner pipe.

4. A connecting and/or branching device according to claim 1, characterized in that the compression of the wall of the end of each of said at least one flexible hose between the rigid inner pipe and the outer covering means is reinforced with the use of an adhesive composition placed between an outer coating of the end of the flexible hose and an inner surface of said outer covering means.

5. A connecting and/or branching device according to claim 1, characterized in that said polymer which makes up the outer covering means is dimensionally stable at room temperature and capable of shrinking by more than 1% of its initial diameter during cooling.

6. A connecting and/or branching device, according to claim 1, characterized in that the inner pipe is made of a composite substance that resists pressure at temperatures exceeding 200° C.

7. A connecting and/or branching device, according to claim 6, characterized in that the inner pipe is made of polyamide 66 which is reinforced with short glass fibers.

8. A plurality of flexible hoses each having inner and outer surfaces and having at one end thereof a connecting device comprising a rigid pipe having outer wall surface portions which extend along the inner surface of the ends of each of the flexible hoses, and means for mechanically compressing the ends of the flexible hoses on said outer surface portions of the rigid pipe to provide a leakproof connecting device, said compressing means comprising a body of a mouldable polymer that is a non-elastic material different than material of the outer surfaces of the flexible hoses and that has been injection moulded over the ends of said flexible hoses to overlie the rigid pipe, said polymer contracting during cooling from its moulding temperature to ambient temperature, said contraction being equal to at least 1% of an original diameter of said polymer body which fits over a hose end to provide said mechanical compressing action on an outer hose surface of each of said plurality of hoses.

9. The flexible hoses and connecting device of claim 8 wherein the rigid pipe outer wall surfaces have an outwardly extending circumferential protuberance means to increase the resistance to separation due to any tensile force between a hose and the connecting device.

10. The flexible hoses and connecting device of claim 9 wherein the circumferential protuberance means is a single circumferential ring at the end of the rigid inner pipe and the polymer is dimensionally stable at room temperature and does not cover the portion of hose which overlies the circumferential ring.

11. The flexible hoses and connecting device of claim 8 further including a layer of adhesive on one of the inner and outer surfaces of the flexible hose ends.

12. The flexible hoses and connecting device of claim 8 further including a layer of adhesive on both of the inner and outer surfaces of the flexible hose ends.

13. The flexible hoses and connecting device of claim 8 wherein the mouldable polymer is technical polyamide that is non-elastic.

14. The flexible hoses and connecting device of claim 13 wherein the rigid pipe is formed of a material which remains rigid at temperatures exceeding 200° C.

15. The flexible hoses and connecting device of claim 14 wherein the rigid pipe material is polyamide 66.

16. At least three flexible hoses having one end each inserted over a connecting device comprising:
   a rigid pipe having outer wall surface portions which extend along a respective inner surface of the ends of each of said flexible hoses; and
   means for mechanically compressing the ends of the flexible hoses on said outer surface portions of the rigid pipe to provide a leakproof connecting device, said compressing means comprising:
   a single, unitary body of a moulded polymer that is dimensionally stable at room temperature and that has been injection moulded over said ends of said flexible hoses and at least selected exposed portions of the rigid pipe;
   said polymer contracting during cooling from its moulding temperature to ambient temperature; and
   said contraction being equal to at least 1% of an original diameter of said polymer body which fits over a hose end to provide mechanical compression on each outer hose surface and on the rigid pipe thereby providing a leakproof connection.

17. A flexible hose and connecting device according to claim 16 wherein the rigid pipe contains a fourth branch on which no flexible hose is applied and which includes a bleeding device.

18. A flexible hose and connecting device according to claim 17 wherein the rigid pipe has outer wall surface portions which include ribs which increase the mechanical bond with the inner surfaces of the ends of the flexible hoses.

19. A flexible hose and connecting device according to claim 16, wherein all portions of the rigid pipe not covered with ends of said flexible hoses are contacted by said single unitary body of moulded polymer whereby uniform compression is applied to the flexible hoses and rigid pipe providing the leakproof connecting device.

* * * * *